(12) United States Patent
Matsubara et al.

(10) Patent No.: US 10,862,115 B2
(45) Date of Patent: Dec. 8, 2020

(54) ANODE MATERIAL FOR SECONDARY BATTERY AND NON-AQUEOUS ELECTROLYTE SECONDARY BATTERY USING THE SAME

(71) Applicant: LG Chem, Ltd., Seoul (KR)

(72) Inventors: Keiko Matsubara, Tokyo (JP); Yoshiyuki Igarashi, Tokyo (JP)

(73) Assignee: LG Chem, Ltd.

( * ) Notice: Subject to any disclaimer, the term of this patent is extended or adjusted under 35 U.S.C. 154(b) by 82 days.

(21) Appl. No.: 15/573,669

(22) PCT Filed: May 30, 2016

(86) PCT No.: PCT/KR2016/005729
§ 371 (c)(1),
(2) Date: Nov. 13, 2017

(87) PCT Pub. No.: WO2016/195360
PCT Pub. Date: Dec. 8, 2016

(65) Prior Publication Data
US 2018/0069237 A1 Mar. 8, 2018

(30) Foreign Application Priority Data
May 29, 2015 (JP) ................................ 2015-110531

(51) Int. Cl.
*H01M 4/38* (2006.01)
*H01M 4/04* (2006.01)
(Continued)

(52) U.S. Cl.
CPC ......... *H01M 4/386* (2013.01); *H01M 4/0488* (2013.01); *H01M 4/134* (2013.01);
(Continued)

(58) Field of Classification Search
None
See application file for complete search history.

(56) References Cited

U.S. PATENT DOCUMENTS

2002/0086211 A1\* 7/2002 Umeno ............. H01M 10/0525
429/231.4
2004/0062990 A1 4/2004 Shimamura et al.
(Continued)

FOREIGN PATENT DOCUMENTS

EP 3236515 A1 10/2017
EP 3236520 A1 10/2017
(Continued)

OTHER PUBLICATIONS

Search report from International Application No. PCT/KR2016/005729, dated Oct. 12, 2016.
(Continued)

*Primary Examiner* — Jonathan Crepeau
(74) *Attorney, Agent, or Firm* — Lerner, David, Littenberg, Krumholz & Mentlik, LLP

(57) ABSTRACT

Provided is an anode material for a secondary battery which reduces and inhibits swelling of a high-capacity silicon-containing alloy material to realize excellent charge/discharge cycle characteristics. The anode material includes alloy particles containing a transition metal which has electron conductivity, is difficult to react with lithium atoms and is at least one selected from the group of metals that belong to transition metals, and silicon, wherein the alloy particles include amorphous silicon, and silicide microcrystals formed by silicon and the transition metal, and the silicide microcrystals are scattered in amorphous silicon.

10 Claims, 4 Drawing Sheets

(51) Int. Cl.
  *H01M 4/58* (2010.01)
  *H01M 4/62* (2006.01)
  *H01M 4/134* (2010.01)
  *H01M 10/0525* (2010.01)
  *H01M 4/583* (2010.01)
  *H01M 4/02* (2006.01)

(52) U.S. Cl.
  CPC ............ *H01M 4/38* (2013.01); *H01M 4/583* (2013.01); *H01M 4/62* (2013.01); *H01M 4/625* (2013.01); *H01M 10/0525* (2013.01); *H01M 2004/027* (2013.01)

(56) References Cited

U.S. PATENT DOCUMENTS

| | | |
|---|---|---|
| 2006/0040182 A1 | 2/2006 | Kawakami et al. |
| 2006/0102472 A1 | 5/2006 | Bito et al. |
| 2007/0048609 A1 | 3/2007 | Ueda et al. |
| 2010/0009258 A1 | 1/2010 | Hasegawa et al. |
| 2012/0037858 A1 | 2/2012 | Kim et al. |
| 2015/0111103 A1 | 4/2015 | Sakaguchi et al. |
| 2017/0352882 A1* | 12/2017 | Miki ................ H01M 4/36 |

FOREIGN PATENT DOCUMENTS

| | | |
|---|---|---|
| JP | 2004103340 A | 4/2004 |
| JP | 2004335272 A | 11/2004 |
| JP | 2009032644 A | 2/2009 |
| JP | 2014107132 A | 6/2014 |
| KR | 20060054153 A | 5/2006 |
| KR | 20070094850 A | 9/2007 |
| KR | 20100080479 A | 7/2010 |
| KR | 20150020188 A | 2/2015 |

OTHER PUBLICATIONS

Supplementary European Search Report for EP16803715 dated Dec. 20, 2018.

* cited by examiner

ANODE MATERIAL FOR SECONDARY BATTERY AND NON-AQUEOUS ELECTROLYTE SECONDARY BATTERY USING THE SAME

CROSS-REFERENCE TO RELATED APPLICATIONS

The present application is a national phase entry under 35 U.S.C. § 371 of International Application No. PCT/KR2016/005729 filed May 30, 2016, which claims priority to Japanese Patent Application No. 2015-110531 filed on May 29, 2015, the disclosures of which are incorporated herein by reference.

TECHNICAL FIELD

The present disclosure relates to an anode material for a secondary battery including amorphous silicon and nanostructured silicide (silicon alloy), and a non-aqueous electrolyte secondary battery using the same.

BACKGROUND ART

Recently, as mobile instruments, personal computers, electric motors and temporary electric condensers have been developed and distributed, there has been a need for high-capacity energy sources. Typical examples of such energy sources include lithium secondary batteries.

Silicon (Si) having a capacity (4200 mAh/g) at least 10 times higher than that of the conventional graphite-based material (theoretical capacity: 372 mAh/g) has been given many attentions as an anode material for a next-generation non-aqueous electrolyte secondary battery. For this, it has been suggested that silicon alloyed with lithium and showing high theoretical capacity is used as an anode active material which is a novel material substituting for a carbonaceous material. However, silicon causes volumetric swelling during charge and volumetric shrinking during discharge. Thus, when a secondary battery repeats charge/discharge, silicon used as an anode active material is micronized to increase particles that lose a conductive path in an electrode and are isolated, resulting in deterioration of the capacity of a secondary battery.

As methods for improving cycle characteristics, 1) micronization of silicon, 2) use of silicon oxide (SiOx), 3) use of a silicon alloy, and the like, have been studied and suggested.

In the method of 1) micronization of silicon, improvement of cycle characteristics can be expected as micronization proceeds. However, there is a limitation in reducing a crystallite size of crystalline silicon. Thus, it is difficult to solve the problem of micronization of silicon during charge/discharge.

In 2) use of silicon oxide (SiOx), it is possible to inhibit micronization by forming silicon microcrystals in amorphous SiOy. However, since oxide consumes Li, the initial charge/discharge efficiency is low. Thus, use of silicon oxide is not suitable for providing a secondary battery with high energy.

In 3) use of a silicon alloy, the silicon alloy may be designed with various materials by varying a metal element to be combined with silicon. Therefore, it is easy to construct a nanostructure which improves cycle characteristics, thereby inhibiting growth of silicon crystallites. Thus, higher charge/discharge efficiency as compared to use of oxide can be expected.

For example, according to Patent Document 1 (Japanese Laid-Open Patent No. 2009-032644), an anode material having a microtexture in which the circumference of multiple Si nuclei are surrounded with an alloy matrix containing a specific element is suggested. There is suggested an anode material which provides excellent cycle characteristics during repeated charge/discharge and high initial charge/discharge efficiency while maintaining high capacity.

In addition, according to Patent Document 2 (Japanese Laid-Open Patent No. 2004-103340), it is stated that the circumference or whole surface of solid phase A (selected from silicon, tin and zinc, low crystalline phase having a crystallite size of 5 nm-100 nm) is coated with solid phase B (at least one selected from Group 2A elements, transition elements, or the like). In this manner, it is possible to obtain an anode material causing low deterioration of cycle characteristics, since solid phase B not participating in charge/discharge inhibits swelling/shrinking of solid phase A.

However, even in the case of the structures suggested by the related art, when silicon crystallite has such a size that can be determined by X-ray diffractometry (about 5 nm or more), it is possible to avoid degradation of capacity during charge/discharge by inhibiting micronization. However, in this case, the swelling ratio is still high. Actually, when the structures are applied to a secondary battery, it is not possible to solve the problem of a change (particularly, an increase) in thickness of a secondary battery.

Under these circumstances, the present disclosure is based on the recognition that a high level of selection of materials, preparation method and a specific manufacturing process are required to obtain a silicon alloy capable of realizing excellent battery characteristics. It is also recognized that sufficient knowledge and experience about a nanostructures is required. However, such recognition was not made according to the related art, and thus such technical items and structural knowledge and experience were not provided.

DISCLOSURE

Technical Problem

The present disclosure is designed to solve the problems of the related art, and therefore the present disclosure is directed to providing a silicon material which maintains its initial structure even after repeating charge/discharge and can inhibit the swelling ratio to a minimum level, and particularly a silicon alloy having relatively high initial efficiency.

Technical Solution

According to the present disclosure, it has been found that when controlling the crystal structure of silicon alloy, particularly alloy particles including a silicon phase capable of lithium intercalation/deintercalation to realize capacity and a silicide phase not alloyed with lithium and not realizing capacity, there is no change in crystal structure caused by charge/discharge, excellent cycle characteristics are realized and the swelling ratio is reduced.

In other words, it has been found that when a silicon alloy does not have a structure in which a silicide phase surrounds the silicon phase but has a structure in which a silicon phase is completely amorphous and a microcrystalline silicide phase is included in an amorphous silicon phase, it is possible to reduce the swelling ratio significantly. The present disclosure is based on this finding.

In one aspect of the present disclosure, there is provided an anode material for a secondary battery, which includes alloy particles containing a transition metal and silicon, wherein the alloy particles include amorphous silicon, and silicide microcrystals formed by silicon and the transition metal, and the silicide microcrystals are scattered in amorphous silicon; and the transition metal has electron conductivity, is difficult to react with lithium atoms and is at least one selected from the group of metals that belong to transition metals.

Particularly, according to a preferred embodiment of the present disclosure, the alloy particles may be provided in a structure in which a carbonaceous material is bound to, attached to or coated on the whole or part of the alloy particles in order to increase the conductivity of the alloy particles. Otherwise, another preferred embodiment is suggested by a structure in which the alloy particles are bound to, attached to or coated on the whole or part of a carbonaceous material.

In another aspect of the present disclosure, there is also provided a method for preparing an anode material (alloy particles) for a secondary battery, which includes:

preparing a transition metal and silicon;

forming a parent alloy containing the transition metal and silicon through liquid quenching;

subjecting the parent alloy to mechanical alloying;

converting silicon into an amorphous structure, thereby providing alloy particles including the amorphous silicon, and silicide microcrystals provided with silicon and the transition metal, wherein the silicide microcrystals are scattered in amorphous silicon, wherein the transition metal has electron conductivity, is difficult to react with lithium atoms and is at least one selected from the group of metals that belong to transition metals.

According to a preferred embodiment of the present disclosure, it is preferred to carry out forming a composite with a carbonaceous material at a temperature, where crystallization of silicon in the alloy particles does not occur, or less. When forming such a composite, it is possible to improve the overall characteristics of a battery.

A secondary battery using the anode material for a secondary battery according to the present disclosure is inhibited from swelling caused by charge within the yield stress range of silicon by virtue of the presence of silicide microcrystals and (perfect) amorphous silicon whose crystallite size cannot be determined by X-ray diffractometry. Thus, it is possible to limit swelling of alloy particles not alloyed with lithium and to significantly inhibit micronization caused by charge/discharge. In addition, availability of silicon is not degraded even after repeating charge/discharge. It is also possible to maintain excellent cycle characteristics and to realize high capacity of a battery.

In addition, a transition metal silicide having high electroconductivity is used to improve charge/discharge cycle characteristics significantly. Further, in an electrode using the alloy particles according to the present disclosure as an anode material, the alloy particles are dispersed homogeneously in the electrode with ease. Thus, it is possible to obtain a uniform swelling ratio of the electrode and to inhibit swelling to the lowest swelling ratio. Therefore, it is possible to further inhibit deterioration caused by swelling and exfoliation of the whole battery.

Further, according to the method of the present disclosure, (1) a compositional ratio near to that of the eutectic point, where a desired high capacity is obtained and an amorphous structure is obtained with ease, is selected and the parent alloy is formed by liquid quenching (preferably, gas atomization), and (2) mechanical alloying treatment is carried out to obtain alloy particles formed by silicide microcrystals and (perfect) amorphous silicon whose crystallite size cannot be determined by X-ray diffractometry and TEM analysis.

When such mechanical alloying treatment is not sufficient, silicon cannot be converted into perfect amorphous silicon, thereby providing a structure in which microcrystals of silicon are scattered in a silicide matrix, as shown in FIG. 1. When the crystallite size of silicon microcrystals is about 10 nm or less, micronization of particles caused by charge/discharge occurs hardly. However, after repeating charge/discharge, the crystallite size gradually increases to cause deterioration of capacity and to increase a change in thickness of an electrode.

However, when mechanical alloying treatment is carried out sufficiently so that perfect amorphous silicon may be obtained according to the present disclosure, a structure in which silicide is scattered in amorphous silicon, as shown in FIG. 2. In addition, according to the present disclosure, it has been found that such a structure causes no recrystallization of silicon even after repeating charge/discharge, realizes excellent charge/discharge cycle characteristics and reduces a swelling ratio significantly.

Advantageous Effects

The present disclosure gives the following effects. A secondary battery using an anode material for a secondary battery according to the present disclosure is inhibited from swelling caused by charge within a yield stress range of silicon by virtue of the presence of silicide microcrystals and (perfect) amorphous silicon whose crystallite size cannot be determined by X-ray diffractometry. In addition, it is possible to limit swelling of alloy particles not alloyed with lithium and to inhibit micronization caused by charge/discharge significantly. In addition, availability of silicon is not degraded even after repeating charge/discharge. It is also possible to maintain excellent cycle characteristics and to realize high capacity of a battery. In addition, a transition metal silicide having high electroconductivity is used to improve charge/discharge cycle characteristics significantly. Further, in an electrode using the alloy particles according to the present disclosure as an anode material, the alloy particles are dispersed homogeneously in the electrode with ease. Thus, it is possible to obtain a uniform swelling ratio of the electrode and to inhibit swelling to the lowest swelling ratio. Therefore, it is possible to further inhibit deterioration caused by swelling and exfoliation of the whole battery.

BEST MODE

Definition (Perfect Amorphous Silicon)

Figure 1:
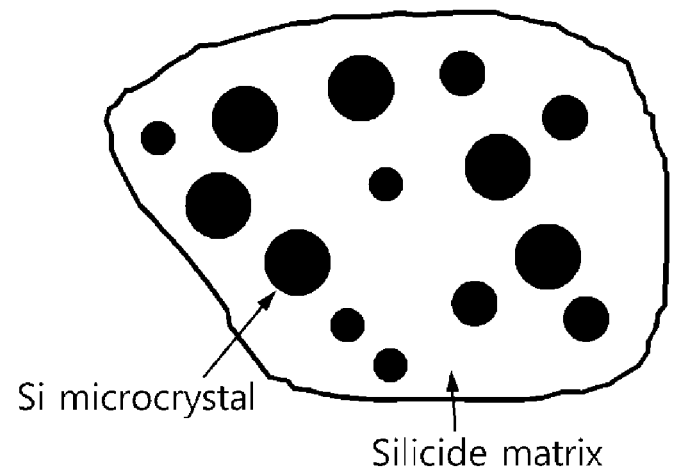
FIG. 1 is a schematic view of silicon alloy particles according to the prior art.

Perfect amorphous silicon means that silicon of the alloy particles according to the present disclosure is present in a portion forming an intermetallic compound with silicon and a portion existing as a silicon group, and the peak of (111) surface of silicon obtained by X-ray diffractometry is not identified. Otherwise, perfect amorphous silicon means that any crystal lattice of silicon is not identified by transmission electron microscopy (TEM).

(Observation of Crystal Structure Using TEM)

TEM is a method which includes irradiating electron rays to a thin section of a sample, imaging the electrons transmitted through the sample or electrons scattered therefrom, and magnifying and observing the image. The transmitted electrons or scattered electrons are selected depending on the particular purpose and imaging is carried out to check the shape, crystal structure, composition, etc. of the sample. Herein, an electron diffraction pattern is used and the inclination of the sample is adjusted so that electron rays may be input along the crystal strip axis of crystals based on high-resolution image observation. In addition, electron beams are irradiated intensively to a small region in the sample and the energy of specific X rays generated therefrom is analyzed, thereby qualitatively determining the elements forming the region. Herein, TEM is used to determine the presence of microcrystals (Si microcrystals) present in a silicon alloy and the size (nm) and crystal lattice thereof.

(X-Ray Diffraction (XRD))

XRD is a technology for analyzing diffraction resulting from scattering and interference of X-rays caused by the surrounding electrons of an atom upon the irradiation of X-rays to a sample (black condition: $2d \sin \theta = n\lambda$, wherein d is a spacing between two surfaces, $\theta$ is an angle forming a plane with X-rays, n is any integer and $\lambda$ is a wavelength of X-rays). Thus, XRD can identify or quantify the constitutional ingredients and specify the crystal size or crystallization degree.

(Crystallite Size)

A crystallite size is calculated, for example, by introducing the measured values obtained by a diffraction device using X-rays to the half-width and Scherrer equation [$D(Å) = K \times \lambda / (\beta \times \cos \theta)$, wherein K is an integer, $\lambda$ is a wavelength of X-rays, $\beta$ is expansion of diffracted rays depending on a crystallite size, and $\theta$ is a diffraction angle $2\theta/\theta$].

It has been determined that the crystallite size of silicon in the alloy particles according to the present disclosure is in such a broad range that it cannot be calculated or a half-width cannot be specified from the half-width of the peak at a diffraction angle $2\theta = 28.4°$ corresponding to (111) crystal surface of silicon as determined by an XRD device available from Bruker Co, and is perfectly amorphous.

(Crystallite)

A crystallite means the largest group of particles regarded as single crystals, and one particle is formed by a plurality of crystallites.

(Volume Accumulated Particle Size Distribution)

In volume accumulated particle size distribution, particle size distribution is obtained assuming one powder group. When an accumulated curve is obtained by taking the total area of the powder group in the particle size distribution as 100%, particle diameters at the points where the accumulated curve becomes 10%, 50% and 90% are expressed as 10% particle diameter, 50% particle diameter (diameter accumulated median diameter: median diameter) and 90% particle diameter (μm), respectively.

(Liquid Quenching)

Liquid quenching is a method for rapidly cooling an alloy which becomes a liquid state at high temperature. A higher quenching rate provides a finer structure of alloy. Liquid quenching processes include single roll quenching, twin-roll quenching and atomization, such as gas atomization, aqueous atomization or disc atomization. Each method has its unique characteristics. In general, each method is used separately depending on the type of metal or desired final shape.

However, in the case of a silicon monomer, it is difficult to obtain an amorphous structure even when carrying out quenching and solidification at a limit rate ($10^{-6}$ K/sec) of a current commercially available system. According to the present disclosure, gas atomization is used to provide a parent alloy. In various liquid quenching methods, gas atomization is advantageous in that it causes less oxidation of a product and can use easily oxidizing elements. In addition, depending on conditions, it is possible to obtain spherical particles having a size (several micrometers to several tens of micrometers) suitable for an anode active material of a secondary battery.

Particularly, raw metallic materials are introduced into a 'crucible' whose opening (several millimeters) present at the bottom is closed with a stopper and are converted into molten metals by high frequency induction, or the like. In this manner, the stopper is separated and the molten metals are allowed to be dropped downwardly. To the molten metals, high-pressure inert gas is sprayed to carry out quenching, thereby providing spherical alloy particles. The size of resultant powder or crystal structure is varied with the size of the opening present at the bottom of the 'crucible', the type of gas or spraying rate.

Herein, the anode active material for a secondary battery causes an increase in side reaction with an electrolyte and a decrease in initial efficiency when an oxidized layer is present in a large amount. Thus, it is preferred to obtain a parent alloy by using gas atomization causing less oxidation among various liquid quenching processes.

(Mechanical Alloying)

Mechanical alloying is a kind of method forming alloy powder and includes mixing at least two metal ingredients (powder), repeating pulverization to carry out a solid phase reaction, and forming homogeneous alloy particles in a solid state. Mechanical energy may be used to form alloy/powder of at least two metal ingredients (powder) at a temperature lower than the melting point. Depending on treatment conditions, it is possible to obtain alloy powder having an amorphous structure, which, otherwise, cannot be obtained merely by quenching and solidification. In addition, it is possible to obtain alloy powder having a uniform composition and reduced segregation.

[Anode Material for Secondary Battery]

(Alloy Particles)

Figure 2:
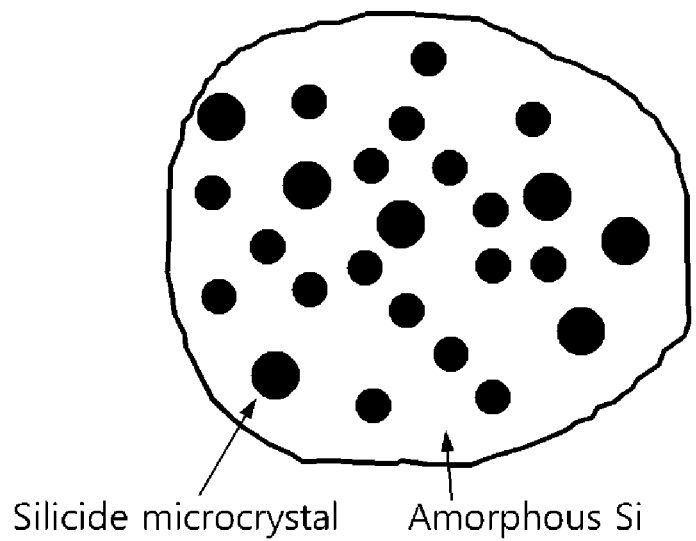
FIG. 2 is a schematic view of the alloy particles according to the present disclosure.

The anode material for a secondary battery according to the present disclosure is alloy particles including amorphous silicon and silicide microcrystals. As described above, conventional alloy particles including silicon and a metal include microcrystals of silicon (Si) atoms in a silicide matrix, as shown in FIG. 1. Meanwhile, the alloy particles according to the present disclosure include silicide microcrystals dispersed in amorphous silicon, as shown in FIG. 2.

According to a preferred embodiment, a carbonaceous material may be bound to, attached to or coated on the whole or part of the surface of alloy particles. Otherwise, the whole or part of a carbonaceous material may be bound to, attached to or coated on the surface of alloy particles, or the alloy particles and a carbonaceous material may form a composite.

(Silicide Microcrystals)

The alloy particles according to the present disclosure include silicide microcrystals scattered (dispersed) in (preferably perfect) amorphous silicon. In the alloy particles according to the present disclosure, substantially no silicon peak is identified by X-ray diffractometry. In addition, even when a very broad peak is present, the half-width cannot be defined.

The crystallite size of the silicide microcrystals is 100 nm or less, preferably 20 nm or less. The silicide microcrystals have a crystal lattice size of 5 Å-50 Å, preferably 5 Å-20 Å.

(Transition Metal)

Any transition metal may be used, as long as it has electron conductivity and is difficult to react with lithium atoms. One metal or a combination of two or more metals selected from a metal group belonging to transition metals may be used.

Particular examples of transition metals include Ti, V, Cr, Mn, Fe, Co, Ni, W, Nb and Cu, preferably any one selected from the group consisting of Ti, Cr, Mn, Fe, Co, Ni and Cu, or a combination thereof. A preferred combination of two or more metals includes Cr, Ti and Fe, Cr with Ti being more preferred.

According to the present disclosure, the transition metal, particularly bismuth (Bi) is added preferably as an adjuvant (such as an antioxidant). Addition of a small amount of Bi increases an anti-oxidation effect, thereby improving initial efficiency.

Referring to a silicide, for example, when using Cr with Ti as a combination of metals, a ternary silicide of $Cr_xSi_yTi_z$ (x, y, z>0) is formed theoretically in addition to a binary silicide such as CrSi, $CrSi_2$, $TiSi_2$, TiSi, or the like. However, such silicides become a complex structure whose composition cannot be defined clearly during quenching and solidification through gas atomization.

((Perfect) Amorphous Silicon)

There is no particular limitation in content of silicon contained in the raw material in a step of carrying out liquid quenching. However, it is preferred that a single phase of (perfect) amorphous silicon, which provides a capacity significantly higher than the capacity provided by the existing carbonaceous material when used as an anode active material, is present.

According to the present disclosure, a transition metal to be combined is converted into silicide through alloying with silicon, but silicide has no capacity. Therefore, since only the amorphous silicon phase in the finished alloy powder contributes to capacity, it is preferred to define the amount of amorphous silicon, not the amount of silicon contained in the alloy particles.

The content of amorphous silicon in the alloy particles is 10 wt % or more, preferably 20 wt % or more and 60 wt % or less, preferably 40 wt % or less. Within the above-defined range, it is possible to obtain sufficient capacity and to significantly inhibit an increase in swelling ratio of a battery during charge/discharge.

<X-Ray Diffractometry, TEM Analysis>

In the alloy particles according to the present disclosure, it is preferred that a portion in which silicon forms an intermetallic compound with a metal and a portion in which silicon exists as a silicon monomer are present, and the peak of silicon (111) surface is not identified as determined by X-ray diffractometry. It is also preferred that no crystal lattice of silicon is identified by TEM.

In addition, according to a preferred embodiment of the present disclosure, the crystallite sizes of all phases contained in the alloy particles may be 30 nm or less, preferably 10 nm or less, and more preferably 5 nm or less, as determined by X-ray diffractometry.

In a secondary battery using the anode material according to the present disclosure, microcrystallization proceeds as the peak of silicon (111) surface corresponding to the highest intensity is not identified when determined by X-ray diffractometry. Thus, swelling caused by charge is alleviated within the yield stress range of silicon. In other words, silicon swells within its yield stress range. Further, the silicide phase becomes a hardly breakable structure in which a plurality of phases is present complicatedly and each of the crystal phases has an unclear boundary, through mechanical alloying treatment, or the like. Therefore, it is thought that such phases inhibit swelling of silicon, thereby preventing micronization caused by charge/discharge. In addition, the silicide phase is effective for increasing conductivity of the alloy particles. Thus, silicon availability is not reduced by repeated charge/discharge and high cycle characteristics can be maintained.

(Volume Accumulated Particle Size Distribution)

According to a preferred embodiment of the present disclosure, the anode material has a 50% particle diameter of 1-5 μm in a volume accumulated particle size distribution. In addition, the anode material has a 90% particle diameter of 30 μm or less, preferably 15 μm or less, and more preferably 10 μm or less in a volume accumulated particle size distribution. In addition, the maximum particle diameter is 35 μm or less, preferably 25 μm or less in a volume accumulated particle size distribution. Herein, the anode material may include the alloy particles alone or may be a composite material with a carbonaceous material. For example, determination of the 50% particle diameter, 90% particle diameter and the maximum particle diameter may be obtained by accumulated frequency as measured by using a laser diffraction particle size distribution measuring system available from Nikiso Company.

[Method for Preparing Anode Material for Secondary Battery]

According to the present disclosure, there is provided a method for preparing alloy particles as an anode material for a secondary battery.

(Raw Materials)

A transition metal and silicon are prepared.

The transition metal is any one selected from a group of metals belonging to the transition metals having electron conductivity and difficult to react with lithium atoms, or a combination of two or more such metals. Description of the transition metal and silicon will be the same as described in the part [Anode Material for Secondary Battery].

(Liquid Quenching Treatment)

According to the present disclosure, silicon and the transition metal are subjected to liquid quenching treatment, preferably atomization treatment (more preferably, gas atomization treatment). In this manner, it is possible to obtain a parent alloy. The parent alloy includes a single phase of crystalline silicon and a silicide phase. As shown in FIG. 1, crystalline silicon is scattered in the matrix of silicide. Additionally, in the case of gas atomization, a composition near to that of the eutectic point is selected so that the size of silicon single phase and silicide phase may become microcrystals having a size of about 100 nm.

(Mechanical Alloying Treatment)

Next, the parent alloy subjected to liquid quenching treatment is treated by mechanical alloying. Theoretically, it is possible to carry out mechanical alloying by mixing silicon with the transition metal not by preparing a parent alloy. However, it is fundamentally difficult to convert silicon into amorphous silicon; a significantly long time of mechanical alloying treatment may be required; or even a long time of treatment cannot provide amorphous silicon depending on the composition as the case may be.

Therefore, it is preferred to control the size or amount of the media used for mechanical alloying treatment of the parent alloy, amount or particle size of the parent alloy, treatment time or other mechanical alloying conditions in order to provide a structure in which silicon is converted sufficiently (perfectly) into amorphous silicon and silicide is scattered in amorphous silicon.

(Formation of Composite with Carbonaceous Material)

The alloy particles subjected to mechanical alloying is an anode active material for a secondary battery which causes no micronization by charge/discharge and has a reduced swelling ratio, and provides excellent battery characteristics. According to another preferred embodiment, in order to facilitate alloying/dealloying with lithium even in the case of high-rate charge/discharge, formation of a composite with a carbonaceous material is suggested to increase electron conductivity.

However, when a thermal process is present during formation of a composite, the amorphous silicon single phase obtained by mechanical alloying may be crystallized. For this, it is preferred to form a composite by avoiding high temperature, such as a temperature of 600° C. or higher. According to a preferred embodiment, in order to avoid the problem of crystallization caused by heating at high temperature in advance, a mechanical process requiring no heating and causing no heat emission is used to form a composite with a carbonaceous material, while inhibiting crystallization of the amorphous silicon single phase.

By using the same method as mechanical alloying, it is possible to form a composite mechanically with a relatively highly crystalline carbonaceous material and to increase conductivity with ease. Depending on the particle diameters of the alloy particles and the carbonaceous material or the condition for forming a composite, the final composite may be provided as a structure in which the alloy particles are bound to, attached to or coated on the circumference of the carbonaceous material, or a structure opposite thereto, i.e., a structure in which the carbonaceous material is bound to, attached to or coated on the circumference of the alloy particles. In any cases, it is possible to obtain an anode material for a secondary battery which has electron conductivity allowing smooth charge/discharge, causes no micronization by charge/discharge and shows a reduced swelling ratio.

In a small scale, a planetary ball mill carrying out rotation and revolution is used preferably as a high-power mechanical alloying system. Otherwise, it is possible to carry out mechanical alloying desirably by using a dry attritor, vibratory mill, blade-attached ball mill, or the like. In each system, it is preferred to adequately determine and optimize the amount of parent alloy powder, size and amount of balls, and the overall conditions, such as the size, rotation number and frequency so as to provide a perfect amorphous structure whose silicon crystallite size cannot be defined by XRD.

[Anode for Secondary Battery]

According to the present disclosure, there is provided an anode for a (lithium) secondary battery including the anode material for a secondary battery according to the present disclosure.

(Conductive Material)

According to a preferred embodiment, there is provided an anode for a secondary battery including carbon nanotubes as a conductive material. According to a more preferred embodiment, the conductive material is used in an amount of 0.1-5 wt %, preferably at least 0.5 wt %, and more preferably at least 1.0 wt % based on the total weight of the anode for a secondary battery.

[Secondary Battery]

According to the present disclosure, there is provided a secondary battery, preferably a lithium secondary battery, which includes an anode, cathode, non-aqueous electrolyte and a separator, wherein the anode is the anode for a secondary battery according to the present disclosure.

In general, a lithium secondary battery includes a cathode including a cathode material and a cathode collector, an anode including an anode material and an anode collector, and a separator which interrupts conduction of electrons between the cathode and the anode to allow conduction of lithium ions, wherein a lithium salt-containing organic electrolyte is injected to a gap between the electrode and the separator to conduct lithium ions.

(Anode)

The anode is obtained, for example, by applying a mixture of an anode material (anode active material), conductive material and a binder onto an anode collector, followed by drying. If desired, a filler may further added to the mixture. The anode material (anode active material) is the anode material for a secondary battery according to the present disclosure.

<Binder for Anode>

The binder is an ingredient by which the binding of the material, conductive material, or the like, or that of the material to a collector is stimulated. In general, the binder is added in an amount of 0.5-2.0 wt % based on the total weight of the mixture including the anode material.

The binder may be any one selected from the group consisting of styrene butadiene rubber (SBR), polyacrylic acid, polyimide, polyvinylidene fluoride, polyacrylonitrile, polyvinylidene fluoride-co-hexafluoropropylene (PVDF-co-HFP), polyvinylidenefluoride, polyvinylidene fluoride-co-trichloro ethylene, polyvinylidene fluoride-co-chlorotrifluoro ethylene, polymethyl methacrylate, polyacrylonitrile, polyvinyl pyrrolidone, polyvinyl acetate, polyethylene-co-vinyl acetate, polyethylene oxide, cellulose acetate, cellulose acetate butyrate, cellulose acetate propionate, cyanoethylpullulan, cyanoethylpolyvinylalchol, cyanoethyl cellulose, cyanoethyl sucrose, pullulan, carboxymethyl cellulose (CMC) and acrylonitrile-styrene-butadiene copolymer, or a mixture of two or more of them. However, the binder is not limited thereto and various types of binder polymers may be used.

<Anode Conductive Material>

In general, a conductive material is added in an amount of 0.1-50 wt % based on the total weight of the mixture including the anode material. When using alloy particles as an anode active material, conductivity is low as compared to graphite. However, it is possible to obtain the characteristics of a battery equivalent to those of a battery using a graphite electrode by selecting a conductive material adequately. Such a conductive material does not cause any chemical change in the battery. For example, the conductive material may include: graphite, such as natural graphite or artificial graphite; carbon black, such as carbon black, acetylene black, Ketjen black (trade name), carbon nanotubes, carbon nanofibers, channel black, furnace black, lamp black or thermal black; conductive fibers, such as carbon fibers or metal fibers; metal powder, such as fluorocarbon, aluminum or nickel powder; conductive whiskers, such as zinc oxide or potassium titanate; metal oxides such as titanium oxide; or conductive materials such as polyphenylene derivatives. Among those, a fibrous conductive material is particularly preferred, since it maintains a conduction path between active materials or between an active material and a collector even under swelling/shrinking caused by charge/discharge and has a structure hardly detachable from an active material, when using alloy particles as an anode active material.

<Anode Collector>

The collector is fabricated to have a thickness of 3-50 μm. Any collector may be used, as long as it does not cause any chemical change in a battery and has high conductivity. For example, copper, stainless steel, aluminum, nickel, titanium, sintered carbon, or aluminum or stainless steel whose surface is treated with carbon, nickel, titanium or silver is used as a collector. The anode collector may have fine surface irregularities to increase adhesion of an anode material, and may have various shapes, such as a film, sheet, foil, net, porous body, foam or nonwoven body.

(Cathode)

The cathode is obtained, for example, by applying a mixture of a cathode material (cathode active material), conductive material and a binder onto a cathode collector, followed by drying. If desired, a filler may further added to the mixture.

<Cathode Active Material>

As a cathode active material, a lithium-containing transition metal oxide may be used preferably. For example, any one selected from the group consisting of $Li_xCoO_2$ (0.5<x<1.3), $Li_xNiO_2$(0.5<x<1.3), $Li_xMnO_2$(0.5<x<1.3), $Li_xMnO_2O_4$(0.5<x<1.3), $Li_x(Ni_aCo_bMn_c)O_2$(0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$(0.5<x<1.3, 0≤y<1), $Li_xNi_{1-y}Mn_yO_2$(0.5<x<1.3, O≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$(0.5<x<1.3, 0<z<2), $Li_xMn_{2-z}Co_zO_4$(0.5<x<1.3, 0<z<2), $Li_xCoPO_4$(0.5<x<1.3) and $Li_xFePO_4$(0.5<x<1.3), or a mixture thereof. The lithium-containing transition metal oxide may be coated with a metal, such as aluminum (Al) or metal oxide. In addition to such lithium-containing transition metal oxides, sulfides, selenides and halides may be used.

<Binder for Cathode>

The binder for a cathode is an ingredient by which the binding of the active material, conductive material, or the like, or that of the active material to a collector is stimulated. In general, the binder is added in an amount of 1-50 wt % based on the total weight of the mixture including the cathode active material. Particular examples of the binder include polyvinylidene fluoride, polyvinyl alcohol, polyimide, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene monomer copolymer (EPDM), sulfonated EPDM, styrene-butyrene rubber, fluororubber, various copolymers, or the like.

<Collector for Cathode>

A cathode collector is provided to have a thickness of 3-50 μm. Any cathode collector may be used, as long as it causes no chemical change in the corresponding battery and has high conductivity. Particular examples of the cathode collector include aluminum, stainless steel, nickel, titanium, sintered carbon, or aluminum or stainless steel whose surface is treated with carbon, nickel, titanium or silver. The cathode collector may have fine surface irregularities to increase the adhesion of a cathode active material. The cathode collector may have various shapes, such as a film, sheet, foil, net, porous body, foam or nonwoven body.

<Conductive Material for Cathode>

The same conductive material as described with reference to anode may be used, but the cathode conductive material is not limited thereto.

(Separator)

A separator is interposed between a cathode and an anode. As a separator, an insulating thin film having high ion permeability and mechanical strength is used. In general, the separator has a pore diameter of 0.01-10 μm and a thickness of 5-200 μm.

Particular examples of the separator include a porous polymer film, including a porous polymer film made of a polyolefin polymer, such as an ethylene homopolymer, propylene homopolymer, ethylene/butane copolymer, ethylene/hexene copolymer or ethylene/methacrylate copolymer, and such a porous polymer film may be used alone or in the form of a laminate. In addition, conventional porous nonwoven web, such as nonwoven web including high-melting point glass fibers or polyethylene terephthalate fibers may be used. However, the separator is not limited thereto. Otherwise, the porous polymer film or porous nonwoven web may include a porous organic/inorganic coating layer containing a mixture of inorganic particles with a binder polymer, on at least one surface thereof. The binder is located on the whole or part of the inorganic particles and functions to connect and fix the inorganic particles to each other.

(Non-Aqueous Electrolyte)

As a lithium salt that may be contained in the non-aqueous electrolyte used herein, a conventional lithium salt used currently for an electrolyte for a lithium secondary battery may be used with no particular limitation. Particular examples of the anion of such a lithium salt include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$.

In addition, any conventional organic solvent may be used as an organic solvent contained in the non-aqueous electrolyte with no particular limitation. Typical examples of the organic solvent include any one selected from the group consisting of fluoroethylene carbonate (FEC), propionate ester, more particularly methyl propionate, ethyl propionate, propyl propionate and butyl propionate, propylene carbonate (PC), ethylene carbonate (EC), diethyl carbonate (DEC), dimethyl carbonate (DMC), ethyl methyl carbonate (EMC), methyl propyl carbonate, dipropyl carbonate, dimethyl sulfoxide, acetonitrile, dimethoxyethane, diethoxyethane, vinylene carbonate, sulforane, γ-butryolactone, polyethylene sulfide and tetrahydrofurane, or a mixture thereof. Particularly, among the carbonate-based organic solvents, cyclic carbonates, such as ethylene carbonate and propylene carbonate are preferred, since they are high-viscosity organic solvents and have a high dielectric constant and allow smooth dissociation of the lithium salt in the electrolyte. In addition, when using such a cyclic carbonate in combination with a low-viscosity low-dielectric constant linear carbonate, such as dimethyl carbonate or diethyl carbonate, at an adequate ratio, it is possible to obtain a non-aqueous electrolyte having high electroconductivity more preferably.

Optionally, the non-aqueous electrolyte used herein may further include additives, such as an overcharge-preventing agent contained in a conventional non-aqueous electrolyte.

(Manufacture)

The secondary battery according to the present disclosure may be manufactured in a conventional manner by inserting a porous separator between a cathode and an anode and introducing a non-aqueous electrolyte thereto. The secondary battery according to the present disclosure may have any outer shape, such as a cylindrical, prismatic or pouch-like shape.

EXAMPLES

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

(Preparation of Anode Material)

Example 1

(1) An anode material was prepared as follows.

1) Preparation of Raw Materials and Liquid Quenching Treatment (Gas Atomization Treatment)

Si, Cr and Ti were prepared and subjected to gas atomization treatment to obtain powder of SiCrTi alloy (Si/Cr/Ti=84/8/8: atom %) as a parent alloy. In addition, the alloy powder was sieved to the maximum diameter of 40 micrometers or less to facilitate conversion of silicon into amorphous silicon in the subsequent mechanical alloying treatment.

2) Mechanical Alloying Treatment

To the alloy powder, 1 wt % of stearic acid was added as an adjuvant. Next, the mixture was introduced to a vibration mill container together with steel balls having a diameter of 15 mm and occupying 80% of the volume of the container. Then, the container was purged with nitrogen gas and mechanical alloying treatment was carried out under a frequency of 1200 cpm for 30 hours. After that, the particle size was adjusted by air classification to an average particle diameter of 3 μm.

(2) Fabrication of Electrodes and Battery

The Si alloy anode material was mixed with graphite having an average particle diameter of 15 μm at a weight ratio of 12:88 to provide an anode active material.

Next, 1 wt % of carbon nanotubes having an average diameter of 10 nm as a conductive material, 1.5 wt % of styrene butadiene rubber as a binder and 1.5 wt % of carboxymethyl cellulose as a thickener were mixed and pure water was added thereto to an adequate viscosity, thereby providing slurry. Then, the slurry was applied to electrolytic copper foil having a thickness of 10 μm to a thickness of about 60 μm and vacuum dried at 100° C. for 8 hours. After that, the resultant structure was punched to a circular shape having a diameter of 13 mm and then pressed, thereby providing an electrode having an electrode density of 1.7 g/cc.

The punched electrode was allowed to face metallic lithium having a thickness of 0.3 mm, and an electrolyte containing FEC, EC and DEC at a mixing ratio of 1:2:7 and including 1M $LiPF_6$ dissolved therein was used to provide a 2016 type coin cell.

Example 2

A coin cell was obtained in the same manner as Example 1, except the following: The alloy powder subjected to mechanical alloying treatment in Example 1 was mixed with graphite having an average particle diameter of 5 μm at a weight ratio of 100:10, and then introduced back to a vibration mill container together with steel balls having a diameter of 2 mm and occupying 40% of the container. Then, the container was purged with nitrogen gas and mechanical alloying treatment was carried out at a frequency of 1200 cpm merely for 30 minutes to obtain a composite of alloy powder with graphite. The particle size was adjusted so that the average particle diameter of the resultant alloy powder may be 3 μm. The alloy powder was mixed with graphite having an average particle diameter of 15 μm at a weight ratio of 12:88 to provide an anode active material.

Comparative Example 1

Electrodes and a battery were obtained in the same manner as Example 1, except that the first mechanical alloying treatment was not carried out but alloy particles obtained through gas atomization was pulverized by a jet mill to an average particle diameter of 3 μm.

Comparative Example 2

A coin cell was obtained in the same manner as Example 1, except that the first mechanical alloying was carried out under the same condition as Example 1, and a carbon coating film was formed on the surface of the alloy particles in an amount of 3 wt % based on the alloy particles by using acetylene gas at 800° C. through CVD to provide an anode active material.

<Evaluation Test: Analysis of Crystal Structure and Nanostructure>

(1) Analysis of Crystal Structure

The SiCrTi alloy powder obtained from Example 1 was analyzed by using D2 Phaser X-Ray Diffractometer available from Bruker Co. to obtain diffraction peaks. However, no peak was observed at around 28.4° corresponding to (111) diffraction peak of silicon.

Referring to Example 2, Comparative Example 1 and Comparative Example 2, the (111) diffraction peak of silicon was observed and the result of crystallite size calculated from the half-width of the peak is shown in the following Table 1.

TABLE 1

| Sample | Crystallite size (nm) |
| --- | --- |
| Example 1 | Not available |
| Example 2 | Not available |
| Comparative Example 1 | 112 |
| Comparative Example 2 | 65 |

(2) Analysis of Nanostructure

The SiCrTi alloy powder obtained from Example 1 was analyzed for its nanostructure through high-resolution TEM analysis (H9500 available from Hitach Co.).

Figure 3:
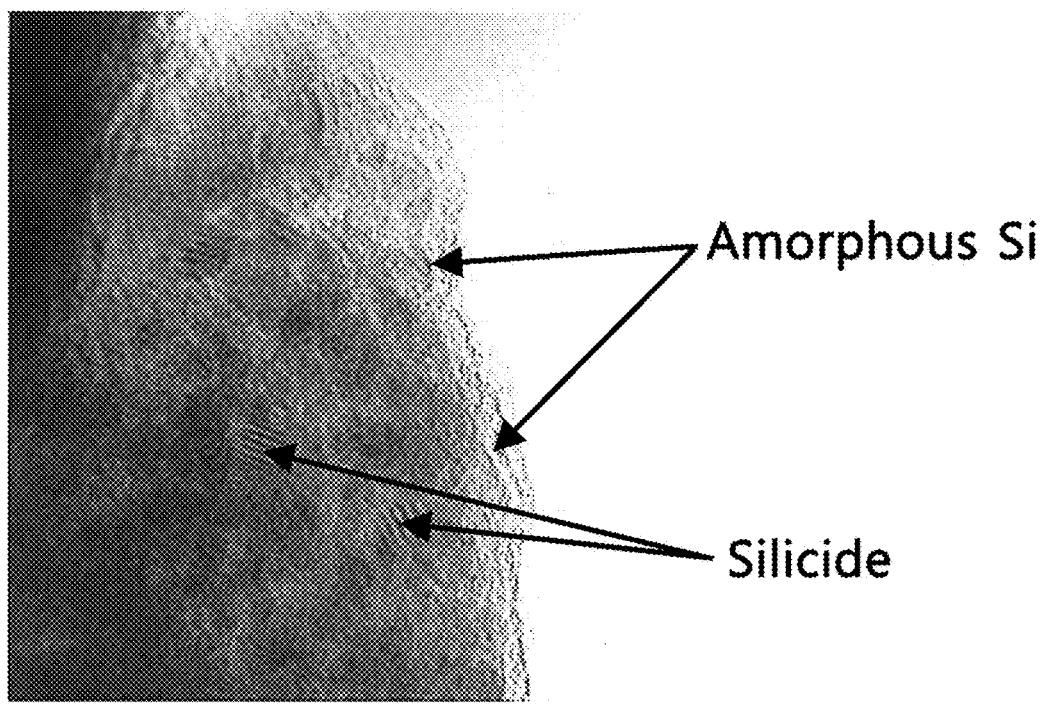
FIG. 3 is a high-resolution transmission electron microscopic (TEM) image of the alloy particles according to the present disclosure.

FIG. 3 is a TEM image taken at 300,000× and shows a structure including amorphous silicon and silicide scattered therein. No crystal structure of silicon was identified. The crystal lattice of silicide was about 10-15 Å. Since the silicide, which occupied a main part initially, was converted into complicated microcrystals through mechanical alloying, it was difficult to define the composition and compositional ratio. The crystallite size of silicide was about 10-30 nm.

Figure 4:
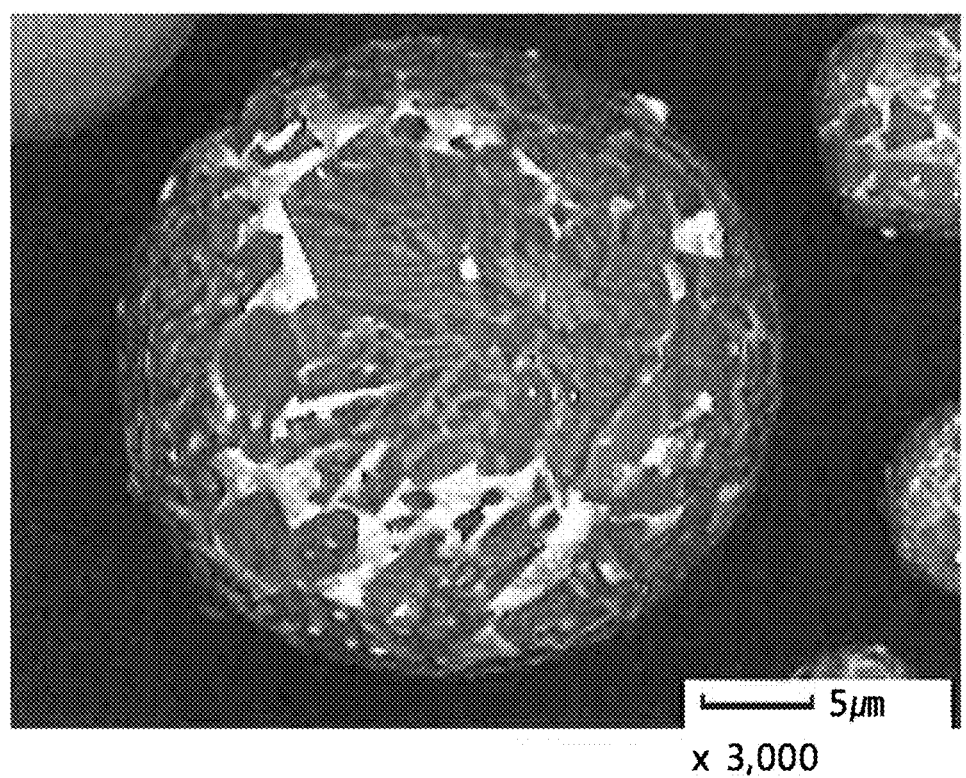
FIG. 4 is a high-resolution transmission electron microscopic (TEM) image of the alloy particles according to Comparative Example 1.

As shown in FIG. 1, Example 1, Comparative Example 1 and Comparative Example 2 have a structure including crystalline Si in combination with silicide. The alloy particles used in Comparative Example 1 were observed by a scanning electron microscope (In touch scope 6010 available from Nippon Denshi Co.) at 3,000× and the resultant image is shown in FIG. 4.

<Evaluation Test 2: Evaluation of Charge/Discharge Cycles>

Each of the coin cells according to Examples and Comparative Examples were subjected to a charge/discharge test at a current rate of 0.5 C for 50 cycles and the test was stopped at the $51^{st}$ charged state. Then, each coin cell was disassembled under dry atmosphere at a dew point of −50° C. and the thickness of an electrode was measured.

The thickness was divided by (discharge capacity at the $50^{th}$ cycle × weight of active material containing conductive material per unit area measured before charge) to calculate the volume of an active material slurry layer per capacity at the $51^{st}$ cycle of charged state. The results are shown in the following Table 2.

TABLE 2

| Sample | Initial efficiency (%) | Capacity maintenance after 50 cycles (%) | Volume of electrode per capacity at $51^{st}$ charge cycle (%) [Relative value based on Example 1] |
|---|---|---|---|
| Example 1 | 91.0 | 91.7 | 100 |
| Example 2 | 91.3 | 96.5 | 95 |
| Comparative Example 1 | 90.7 | 66.3 | 201 |
| Comparative Example 2 | 90.9 | 81.0 | 152 |

<Evaluation Test 3: Evaluation of Silicide Scattering>

Figure 5:
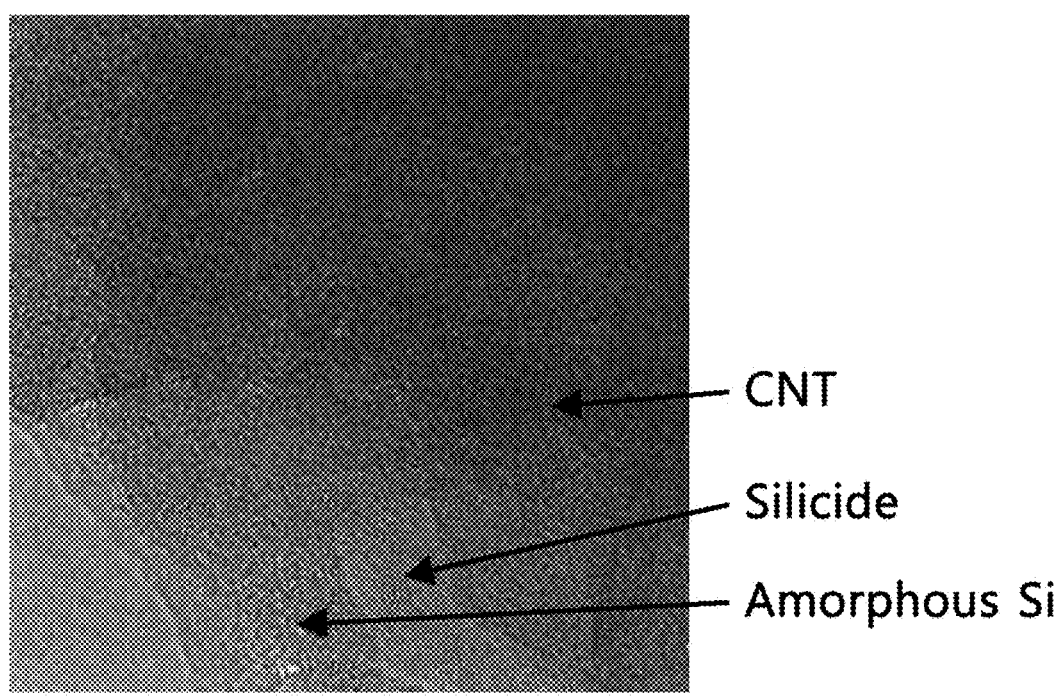
FIG. 5 is a high-resolution TEM image of the electrode according to Example 2 in a state charged 51 times, which illustrates the alloy particle portion.

The electrode according to Example 1 taken out of the coin cell in the $51^{st}$ cycle of charged state was cleaned lightly with dimethyl carbonate in a dry room at a dew point of −50° C., transferred to a transfer vessel and observed by TEM. The resultant image is shown in FIG. 5. As shown in FIG. 5, it can be seen that a structure which includes silicon maintaining an amorphous state even after charge/discharge cycles, like silicon before charge, and silicide scattered therein is maintained.

<Overall Evaluation>

According to the present disclosure, when mechanical alloying is carried out sufficiently until silicon becomes perfect amorphous, a structure including silicide scattered in amorphous silicon is formed and thus no crystallization of silicon occurs even after repeating charge/discharge. In addition, it is possible to obtain excellent cycle characteristics by forming a composite with a carbonaceous material through a process not requiring an increase in temperature.

What is claimed is:

1. A secondary battery, comprising:
   a cathode;
   an anode comprising an anode material;
   a non-aqueous electrolyte; and
   a separator,
   wherein the anode material, prior to an initial charge/discharge cycle of the secondary battery, comprises:
   a composite comprising alloy particles and a carbonaceous material, wherein the composite is prepared by mechanical alloying of the alloy particles and the carbonaceous material,
   wherein the alloy particles containing amorphous silicon, and silicide microcrystals containing silicon and a transition metal,
   wherein the silicide microcrystals are scattered in the amorphous silicon,
   wherein the transition metal has electron conductivity, and is difficult to react with lithium atoms, and
   wherein the silicon present in the alloy particles is present in the silicide microcrystals and the amorphous silicon, and
   wherein the diffraction peak of (111) surface of silicon is not identified in the alloy particles after formation of the composite when measured by X-ray diffractometry.

2. The secondary battery according to claim 1, wherein the silicide microcrystals have a crystallite size of 5-100 nm.

3. The secondary battery according to claim 1, wherein the silicide microcrystals have a crystal lattice of 5-20 Å.

4. The secondary battery according to claim 1, wherein the transition metal is any one selected from the group consisting of Ti, V, Cr, Mn, Fe, Co, Ni, W, Nb and Cu, or a mixture thereof.

5. The secondary battery according to claim 1, wherein the content of amorphous silicon contained in the alloy particles is 10-60 wt %.

6. The secondary battery according to claim 1, wherein the anode material has a 50% particle diameter of 1-5 μm in a volume accumulated particle size distribution, and the anode material has a 90% particle diameter of 5-30 μm in a volume accumulated particle size distribution.

7. The secondary battery according to claim 1, wherein the anode further comprising a conductive material, wherein the conductive material comprises carbon nanotubes.

8. The secondary battery according to claim 7, wherein the conductive material is present in an amount of 0.1 weight percent (wt %) to 5 wt % based on the total weight of the anode for a secondary battery.

9. The secondary battery according to claim 1, which is a lithium secondary battery.

10. A method for preparing the anode material for a secondary battery as defined in claim 1, comprising:
   heating a transition metal and silicon to a liquid state;
   cooling the heated transition metal and silicon to form a parent alloy containing a silicide containing silicon and the transition metal and crystalline silicon;
   mechanically alloying the parent alloy to form the alloy particles including the amorphous silicon, and silicide microcrystals, where the mechanical alloying inhibits crystallization of amorphous silicon such that the diffraction peak of (111) surface of silicon is not identified in the alloy particles when measured by X-ray diffractometry; and
   mechanically alloying the alloy particles and a carbonaceous material to form a composite, wherein the mechanical alloying to form the composite is different from the mechanical alloying used to form the alloy particles, and wherein the diffraction peak of (111) surface silicon is not identified in the alloy particles after formation of the composite.

* * * * *